United States Patent
Yoon et al.

(10) Patent No.: US 11,112,493 B2
(45) Date of Patent: Sep. 7, 2021

(54) LIDAR SYSTEM AND METHOD OF DRIVING THE SAME

(71) Applicant: SAMSUNG ELECTRONICS CO., LTD., Suwon-si (KR)

(72) Inventors: Heesun Yoon, Incheon (KR); Inoh Hwang, Seongnam-si (KR); Tatsuhiro Otsuka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 555 days.

(21) Appl. No.: 16/034,033

(22) Filed: Jul. 12, 2018

(65) Prior Publication Data

US 2019/0219675 A1    Jul. 18, 2019

(30) Foreign Application Priority Data

Jan. 12, 2018    (KR) .................. 10-2018-0004612

(51) Int. Cl.
  *G01S 7/48*    (2006.01)
  *G01S 7/481*    (2006.01)
  *G01S 7/497*    (2006.01)
  *G02F 1/29*    (2006.01)

(52) U.S. Cl.
  CPC ............ *G01S 7/4817* (2013.01); *G01S 7/497* (2013.01); *G02F 1/292* (2013.01)

(58) Field of Classification Search
  CPC .......... G01S 17/89; G01S 17/42; G01S 17/10; G01S 7/484; G01S 7/4865; G01S 17/026; G01S 17/936; G01S 7/4817; G01S 7/497; G01F 1/292
  See application file for complete search history.

(56) References Cited

U.S. PATENT DOCUMENTS

| | | | |
|---|---|---|---|
| 6,946,992 B2 | 9/2005 | McCleary et al. | |
| 9,383,597 B2 | 7/2016 | Matsumoto et al. | |
| 9,772,399 B2 | 9/2017 | Schwarz et al. | |
| 9,922,855 B2 | 3/2018 | Zhang et al. | |
| 2012/0196545 A1 | 8/2012 | Schmidt et al. | |
| 2015/0362587 A1* | 12/2015 | Rogan ................... | G01S 7/4972 702/104 |

(Continued)

FOREIGN PATENT DOCUMENTS

| | | |
|---|---|---|
| KR | 10-2016-0110095 A | 9/2016 |
| KR | 10-2016-0150335 A | 12/2016 |

(Continued)

*Primary Examiner* — Luke D Ratcliffe

(74) *Attorney, Agent, or Firm* — Sughrue Mion, PLLC

(57) ABSTRACT

Provided is a light detection and ranging (LiDAR) system including: a light source; a beam steering device configured to steer light emitted from the light source toward an object; a light detector configured to detect light reflected from the object; and a processor. The beam steering device may include an optical phased array, including a plurality of channels, and a signal input unit which applies a plurality of driving signals to the plurality of channels. The processor is configured to perform an optimization operation including analyzing the light detected by the light detector, calculating at least one correction value, and controlling the plurality of driving signals according to the at least one correction value, in order to correct an error of the beam steering device.

19 Claims, 7 Drawing Sheets

(56) References Cited

U.S. PATENT DOCUMENTS

| | | | |
|---|---|---|---|
| 2016/0041266 A1* | 2/2016 | Smits | G01S 7/497 356/5.01 |
| 2017/0153527 A1 | 6/2017 | Kim et al. | |
| 2017/0153528 A1 | 6/2017 | Kim et al. | |
| 2017/0168373 A1 | 6/2017 | Kim et al. | |
| 2018/0059248 A1* | 3/2018 | O'Keeffe | G01S 7/4811 |
| 2018/0062341 A1 | 3/2018 | Kim et al. | |
| 2018/0136539 A1 | 5/2018 | Kim et al. | |
| 2018/0136540 A1 | 5/2018 | Park | |
| 2018/0136542 A1 | 5/2018 | Kim et al. | |
| 2018/0312125 A1* | 11/2018 | Jung | G01S 17/931 |
| 2019/0025509 A1 | 1/2019 | Kim et al. | |
| 2019/0079367 A1 | 3/2019 | Park et al. | |

FOREIGN PATENT DOCUMENTS

| | | |
|---|---|---|
| KR | 10-2016-0150588 A | 12/2016 |
| KR | 10-2017-0062093 A | 6/2017 |
| KR | 10-2017-0062096 A | 6/2017 |
| KR | 10-2017-0069752 A | 6/2017 |
| KR | 10-2017-0090230 A | 8/2017 |
| KR | 10-2017-0093688 A | 8/2017 |
| KR | 10-2018-0024249 A | 3/2018 |
| KR | 10-2018-0053029 A | 5/2018 |
| KR | 10-2018-0053157 A | 5/2018 |
| KR | 10-2018-0054363 A | 5/2018 |
| KR | 10-2019-0011121 A | 2/2019 |
| KR | 10-2019-0030033 A | 3/2019 |
| WO | 2014/155439 A1 | 10/2014 |

* cited by examiner

FIG. 10A

| GR_1 | CH_1 ~ CH_8 |
|---|---|
| GR_2 | CH_9 ~ CH_16 |
| ⋮ | ⋮ |
| GR_j | CH_k, k IS INTEGER BETWEEN (M/N)(j−1) +1 AND j(M/N) |
| ⋮ | ⋮ |
| GR_16 | CH_121 ~ CH_128 |

FIG. 10B

| GR_1 | CH_1, CH_9, ⋯, CH_113 |
|---|---|
| GR_2 | CH_2, CH_10, ⋯, CH_114 |
| ⋮ | ⋮ |
| GR_j | CH_p, p IS EQUAL TO (M/N)(q−1) + j, q IS INTEGER BETWEEN 1 AND (M/N) |
| ⋮ | ⋮ |
| GR_16 | CH_16, CH_24, ⋯, CH_128 |

FIG. 11

| | GR_1 | GR_2 | ⋯ | GR_j | ⋯ | GR_16 |
|---|---|---|---|---|---|---|
| SEARCH FOR CORRECTION VALUE | ⇑ GCV_1_1 GCV_1_2 ⋮ GCV_1_b ⋮ | ⇑ GCV_2_1 GCV_2_2 ⋮ GCV_2_b ⋮ | ⋯ | ⇑ GCV_j_1 GCV_j_2 ⋮ GCV_j_b ⋮ | ⋯ | ⇑ GCV_16_1 GCV_16_2 ⋮ GCV_16_b ⋮ |

LIDAR SYSTEM AND METHOD OF DRIVING THE SAME

CROSS-REFERENCE TO RELATED APPLICATION

This application claims priority from Korean Patent Application No. 10-2018-0004612, filed on Jan. 12, 2018, in the Korean Intellectual Property Office, the disclosure of which is incorporated herein in its entirety by reference.

BACKGROUND

1. Field

Apparatuses and methods, consistent with exemplary embodiments, relate to a light detection and ranging (LiDAR) system and a method of driving the same.

2. Description of the Related Art

A LiDAR system, including sensors or scanners configured to sense obstacles in various fields of self-driving devices, such as smart vehicles, robots, etc., may be implemented in any of a variety of devices, such as depth cameras, laser radar (LADAR), range sensors in robotic navigation systems, etc.

A LiDAR system may generally include a beam steering device configured to irradiate a laser beam toward a target spot. The beam steering device may include an optical phased array (OPA) using a non-mechanical steering method. The OPA may emit an incident beam by steering the incident beam according to a certain angle, and light interference occurs between light emitted from different channels when there is a certain phase difference between adjacent ones of the channels.

A beam profile scanned by an OPA may thus not be implemented in a desired precise form due to errors between the channels. Thus, a technique for measuring and correcting these errors is desired.

SUMMARY

One or more exemplary embodiments may provide a light detection and ranging (LiDAR) system and method of driving, whereby a beam profile scanned by a beam steering device has an improved quality.

Additional exemplary aspects and advantages will be set forth in part in the description which follows and, in part, will be apparent from the description, or may be learned by practice of the presented exemplary embodiments.

According to an aspect of an exemplary embodiment, a light detection and ranging (LiDAR) system includes: a light source; a beam steering device configured to steer light emitted from the light source in a direction toward an object; a light detector configured to detect light steered by the beam steering device and reflected from the object; and a processor. The beam steering device includes an optical phased array, including a plurality of channels, and a signal input unit configured to apply a plurality of driving signals to the plurality of channels. The processor is configured to perform an optimization operation including analyzing the light detected by the light detector, calculating at least one correction value with respect to the plurality of driving signals, and controlling the plurality of driving signals according to the at least one correction value, in order to correct an error of the beam steering device.

Each of the driving signals may be an electrical signal for adjusting a phase of light emitted from a respective one of the plurality of channels.

The processor may further be configured to determine the at least one correction value such that a signal to noise ratio (SNR) of a beam profile, output according to the at least one correction value, exceeds a certain reference value.

The processor may further be configured to perform the optimization operation and thereby calculate a correction value with respect to each of the plurality of channels.

The plurality of channels may include a plurality of groups, each comprising at least one of the plurality of channels, and the processor may further be configured to perform the optimization operation and thereby calculate a correction value for each of the plurality of groups.

The plurality of groups may be determined based on an order in which the plurality of channels are adjacent to each other.

The plurality of groups may be determined based on a certain distance between the plurality of channels.

The processor may further be configured to perform an additional optimization operation taking an error among the plurality of groups into account.

The processor may be configured to perform the optimization operation at an initial point in time at which the beam steering device starts to scan the object.

The processor may further be configured to perform the optimization operation at least two times, while the beam steering device scans the object.

The processor may further be configured to perform the optimization operation when there is a change in beam intensity at a certain reference location with respect to the object.

The optical phased array may include a plurality of meta-devices, wherein the plurality of meta-devices include an active layer having an optical property that varies based on an electrical signal applied thereto, and a sub-wavelength nano-structure, the nano-structure being arranged to be adjacent to the active layer.

The optical phased array may include a light waveguide including an input on which light from the light source is incident and a plurality of output terminals, and a phase shifter configured to adjust a phase delay of light output from each of the plurality of output terminals.

According to an aspect of another exemplary embodiment, a method of driving a light detection and ranging (LiDAR) system includes: applying a driving signal to a beam steering device; driving the beam steering device according to the driving signal so that light from a light source scans an object; detecting light reflected from the object via a light detector; and performing an optimization operation including analyzing the light detected by the light detector and calculating a correction value with respect to the driving signal, in order to correct an error of the beam steering device.

The optimization operation may be performed at an initial point in time when the beam steering device starts to scan the object.

The optimization operation may be performed at least two times, while the beam steering device scans the object.

The driving signal applied to the beam steering device may be updated in real time by reflecting the correction value calculated in the optimization operation.

The optimization operation may include using a search algorithm to search for the correction value until a signal to noise ratio (SNR) of a beam profile based on the driving signal in which the correction value is reflected exceeds a certain reference value.

The beam steering device may include an optical phased array and a signal input unit, wherein the optical phased array includes a plurality of channels and the signal input unit is configured to apply the driving signal to each of the plurality of channels. The plurality of channels may include a plurality of groups, each including at least one of the plurality of channels, based on an order in which the plurality of channels are adjacent to each other. The calculating the correction value may include calculating a correction value for each group.

The plurality of groups may be based on a certain distance between the plurality of channels.

BRIEF DESCRIPTION OF THE DRAWINGS

These and/or other exemplary aspects and advantages will become apparent and more readily appreciated from the following description of the exemplary embodiments, taken in conjunction with the accompanying drawings in which:

FIGS. 10A and 10B illustrate examples in which a plurality of channels (M channels) are grouped into a plurality of groups (N groups) in the flowchart of FIG. 9; and FIG. 11 is a conceptual view for describing a process of changing a correction value assigned to each group and searching for an optimized correction value in the flowchart of FIG. 9.

DETAILED DESCRIPTION

Figure 1:
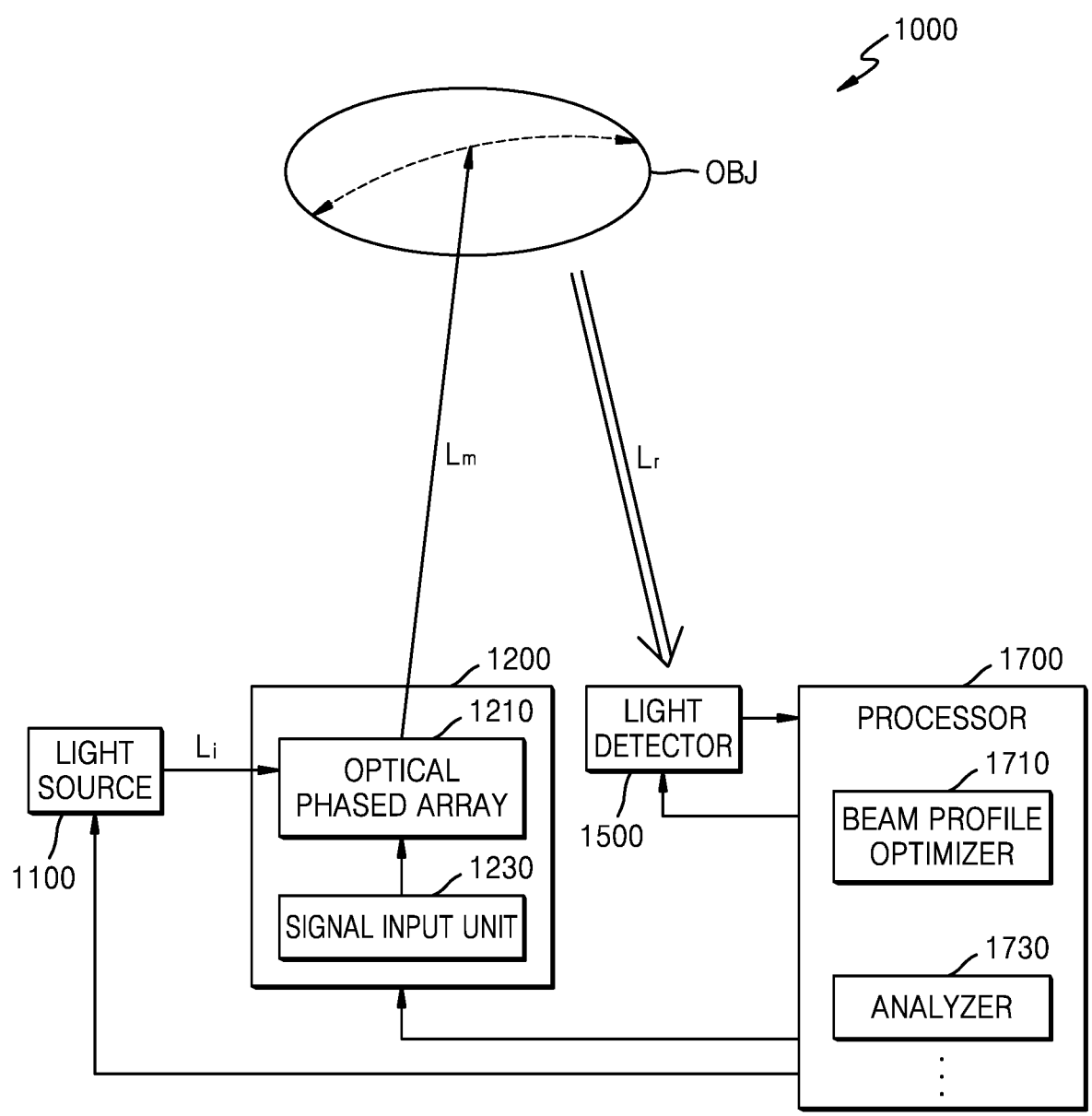
FIG. 1 is a schematic block diagram of a structure of a light detection and ranging (LiDAR) system according to an exemplary embodiment.

Hereinafter, exemplary embodiments of the present disclosure will be described in detail with reference to the accompanying drawings. In the drawings, the same reference numerals denote the same elements and the thicknesses of layers and regions and the sizes of components may be exaggerated for clarity. The exemplary embodiments described hereinafter may have different forms and should not be construed as limited to the exemplary embodiments set forth herein.

Hereinafter, it will also be understood that when a layer is referred to as being "above" or "on" another layer or a substrate, it can be directly on the other layer or the substrate, or intervening layers may also be present therebetween.

It will be understood that although the terms "first," "second," etc. may be used herein to describe various components, these components should not be limited by these terms. These components are only used to distinguish one component from another.

As used herein, the singular forms "a," "an," and "the" are intended to include the plural forms as well, unless the context clearly indicates otherwise. It will be further understood that when a part "includes" or "comprises" an element, unless otherwise defined, the part may further include other elements, not excluding the other elements.

Also, the terms such as "unit," "module," or the like used in the present specification indicate a unit or module, for example, which processes at least one function or motion, and the unit or module may be implemented by hardware or software, or by a combination of hardware and software.

As used herein, the term "and/or" includes any and all combinations of one or more of the associated listed items. Expressions such as "at least one of," when preceding a list of elements, modify the entire list of elements and do not modify the individual elements of the list.

Figure 2:
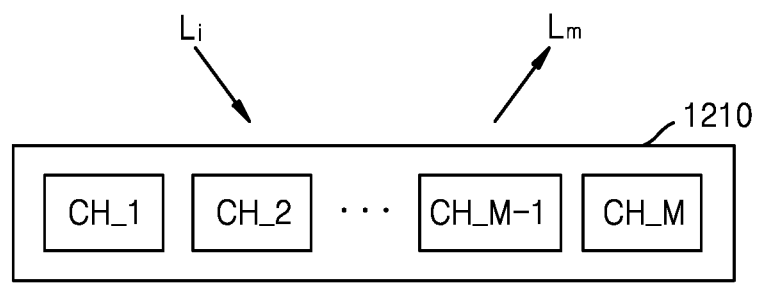
FIG. 2 is a conceptual view for describing modulation of incident light via an optical phased array implemented in the LiDAR system of FIG. 1.

FIG. 1 is a schematic block diagram of a structure of a light detection and ranging (LiDAR) system 1000 according to an exemplary embodiment. FIG. 2 is a conceptual view for describing modulation of incident light via an optical phased array 1210 implemented in the LiDAR system 1000 of FIG. 1.

Referring to FIG. 1, the LiDAR system 1000 may include a light source 1100, a beam steering device 1200, a light detector 1500, and a processor 1700, wherein the beam steering device 1200 is configured to modulate a phase of light $L_i$ from the light source 1100 and emit modulated light $L_m$ in a direction toward an object OBJ, the light detector 1500 is configured to receive light $L_r$ reflected from the object OBJ, and the processor 1700 is configured to analyze the light received by the light detector 1500 and calculate a correction value for a driving signal applied to the beam steering device 1200.

The light source 1100 is configured to irradiate light to be used to analyze a location or a shape of the object OBJ. The light source 1100 may generate and irradiate light in a certain wavelength range. For example, the light source 1100 may include light sources, such as a laser diode (LD), a light-emitting diode (LED), a super luminescent diode (SLD), etc., which are configured to generate and irradiate light in a wavelength range, for example, light in an infrared wavelength range, which is suitable to analyze the location and the shape of the object OBJ. The light source 1100 may generate and irradiate light in a plurality of different wavelength ranges. The light source 1100 may generate and irradiate pulsed light or continuous light.

The beam steering device 1200 may include the optical phased array 1210 including a plurality of channels CH_1, CH_2, CH_M−1, and CH_M configured to modulate a phase of the incident light $L_i$, and a signal input unit 1230 configured to apply a modulation signal to each of the plurality of channels CH_1, CH_2, . . . , CH_M−1, and CH_M.

Referring to FIG. 2, the optical phased array 1210 may include the plurality of channels CH_1, CH_2, ..., CH_M−1, and CH_M. Each of the plurality of channels CH_1, CH_2, ..., CH_M−1, and CH_M may be separately controlled to modulate the phase of the incident light $L_i$, and the signal may be applied from the signal input unit 1230 to each the plurality of channels CH_1, CH_2, ..., CH_M−1, and CH_M, so that a phase profile formed by the plurality of channels CH_1, CH_2, ..., CH_M−1, and CH_M satisfies a certain condition of modulation light. The certain condition of modulation light may be a certain angle by which the incident light $L_i$ is steered toward the object OBJ. Also, the angle may be changed over time in order to scan the whole object OBJ. That is, in the optical phased array 1210, the signal applied to each of the plurality of channels CH_1, CH_2, ..., CH_M−1, and CH_M may be controlled according to time, so that a certain range of angles of the incident light $L_i$ may be scanned over time.

The beam steering device 1200 may be controlled by the processor 1700 and an input signal applied to the beam steering device 1200 may be adjusted in real time so that a desired beam profile may be formed. As a result, the accuracy in which the object OBJ is scanned may be increased.

The light detector 1500 may include an array of a plurality of light detecting elements configured to sense the light $L_r$ reflected from the object OBJ. Also, the light detector 1500 may further include circuit elements, such as an amplifier (AMP) configured to amplify signals, a time to digital converter (TDC) configured to analyze distance information, etc. Information of the reflected light $L_r$ received by the light detector 1500 may be used not only to analyze the object OBJ, but also to optimize a beam profile formed by the beam steering device 1200.

The processor 1700 may control general operations of the LiDAR system 1000.

The processor 1700 may include a beam profile optimizer 1710 configured to analyze the light detected by the light detector 1500 and calculate a correction value with respect to the driving signal applied to the beam steering device 1200. Also, the processor 1700 may include an analyzer 1730 configured to analyze the light signal received by the light detector 1500 and analyze whether or not the object OBJ exists, and, if the object OBJ exists, a motion, location, shape, material, etc. of the object OBJ. In addition, the processor 1700 may include control modules configured to control operations of the light source 1100, the beam steering device 1200, and the light detector 1500. For example, the processor 1700 may control power supply, on/off, pulse wave (PW) or continuous wave (CW) generation, etc. with respect to the light source 1100. Also, the processor 1700 may apply a control signal to each of the light detecting elements of the light detector 1500 and may apply, to the signal input unit 1230 of the beam steering device 1200, a driving signal to scan the object OBJ.

The processor 1700 may determine an angle at which the object OBJ is to be scanned and transmit the driving signal to the signal input unit 1230 of the beam steering device 1200 such that light is steered in this determined direction, thereby controlling a phase of each of the plurality of channels CH_1, CH_2, ..., CH_M−1, and CH_M included in the optical phased array 1210.

The beam profile formed by this process, that is, the distribution of intensities based on angles, may include not only a main lobe indicating a peak at an intended angle, but also one or more side lobes indicating peaks at other angles. A side lobe may, effectively, be noise and may decrease the signal to noise ratio (SNR), thus deteriorating the efficiency of the whole LiDAR system 1000.

The LiDAR system 1000 according to the present exemplary embodiment may include the beam profile optimizer 1710 in order to provide an optimized beam profile when scanning the object OBJ. The optimization of the beam profile may be realized by adjusting a phase realized by each of the plurality of channels CH_1, CH_2, ..., CH_M−1, and CH_M to form a desired beam profile. To this end, the driving signal applied to each of the plurality of channels CH_1, CH_2, ..., CH_M−1, and CH_M may be adjusted. In order to adjust the driving signal, the beam profile formed by the beam steering device 1200 may be measured and analyzed by using information received by the light detector 1500. For example, an SNR of the formed beam profile may be measured, a correction value intended to increase the SNR may be calculated, and the correction value may be provided to the beam steering device 1200 as feedback. In this process, an optimization algorithm may be used. A variable for optimization may include a correction value of the driving signal applied to each of the plurality of channels CH_1, CH_2, ..., CH_M−1, and CH_M, or for efficient processing, a correction value with respect to each of a certain proper number of groups, into which the plurality of channels CH_1, CH_2, ..., CH_M−1, and CH_M are grouped. This aspect will be described in more detail below with reference to a method of driving the LiDAR system.

The optimization operation of the beam profile optimizer 1710 may be performed at an initial point in time at which the beam steering device 1200 initially starts to scan the object OBJ. In addition to this initial point in time, the optimization operation of the beam profile optimizer 1710 may be performed, while the beam steering device 1200 scans the object OBJ. That is because even if, at the initial point in time, a correction value with respect to the driving signal for forming a desired beam profile is calculated and feedback regarding the correction value is given to the beam steering device 1200, errors in the beam profile may increase over time. This phenomenon may be caused by a change over time of the performance of devices included in each of the plurality of channels CH_1, CH_2, ..., CH_M−1, and CH_M of the beam steering device 1200, a change over time of external environments, etc. This phenomenon is also experimentally identified. By taking into account this phenomenon, the optimization operation may be additionally performed as desired, after being performed once, while the beam steering device 1200 scans the object OBJ. The optimization operation at the initial point in time is not essential, and the optimization operation may be performed by selecting a certain point in time while the beam steering device 1200 scans the object OBJ.

In addition to the initial point in time, the optimization operation may be performed when there is a change in beam intensity at a certain reference location with respect to the object OBJ. For example, while the object OBJ is scanned, light may be irradiated onto the same location of the object OBJ, and here, when it is determined that there is a significant change in the beam intensity at the same location, as compared with a beam intensity indicated in a previous beam profile, an additional optimization operation may be performed. Also, when a detection location of the light irradiated onto the same location of the object OBJ has changed, that is, when the light is detected by the light detecting element at a different location, from among the light detecting elements of the light detector 1500, it may be determined that an additional optimization operation is desired.

The above detailed description with respect to the point in time of the optimization operation is only exemplary, and it is possible to determine the point in time at which the optimization operation is performed, based on other methods. For example, the optimization operation may be performed at points in time generated by equally dividing the total scanning time of the object OBJ by a certain plural number.

The analyzer 1730 may analyze the received light signal to analyze whether or not the object OBJ exists, and, if the object OBJ exists, the location, the shape, the material, etc. of the object OBJ. For example, the analyzer 1730 may perform a calculation operation for measuring a time of flight and based on the calculation operation may determine a three-dimensional (3D) shape of the object OBJ, or may analyze the material of the object OBJ by using the Raman analysis method.

The analyzer 1730 may use any of various calculation methods. For example, according to a direct-time-measuring method, pulsed light may be irradiated onto the object OBJ and a time during which the light is reflected from the object OBJ and returns may be measured by using a timer in order to obtain a distance to the object OBJ. According to a correlation method, pulsed light may be irradiated onto the object OBJ and a distance may be measured from a brightness of the light reflected from the object OBJ and returning. A phase delay measuring method is a method of irradiating, onto the object OBJ, light in a continuous wave, such as a sine wave, and sensing a phase difference of the light reflected from the object OBJ and returning and converting the phase difference into a distance.

Also, the analyzer 1730 may analyze a type, a property, a concentration, and a material of the object OBJ by using a Raman analysis method configured to detect a wavelength change caused by the object OBJ.

The analyzer 1730 may transmit a result of the calculation, that is, information of the shape, location, and material of the object OBJ, to another unit. For example, the information may be transmitted to a self-driving apparatus needing information of a 3D shape, a movement, and a location of the object OBJ. Also, the information may be transmitted to a medical apparatus configured to utilize information of the material of the object OBJ, for example, biometric information. Alternatively, the other unit to which the calculation result is transmitted may be a display apparatus or a printer configured to print the result of the calculation. In addition, the other unit may include, but is not limited to, a smartphone, a cellular phone, a personal digital assistant (PDA), a laptop computer, a personal computer (PC), and any other mobile or non-mobile computing device.

The LiDAR system 1000 may include a memory storing programs and other data for operations performed by the processor 1700.

The LiDAR system 1000 may be used as a sensor configured to obtain 3D information of a front object in real time, and thus, may be implemented in self-driving devices, such as unmanned vehicles, autonomous vehicles, robots, drones, etc.

The LiDAR system 1000 may analyze the beam profile formed by the beam steering device 1200, calculate the correction signal, and give feedback with respect to the calculated correction signal to the beam steering device 1200, in order to scan the object OBJ based on a beam profile having improved accuracy. Accordingly, an accuracy of analyzing the object OBJ may be increased.

The optical phased array 1210 included in the LiDAR system 1000 may use a non-mechanical steering method.

Figure 3:
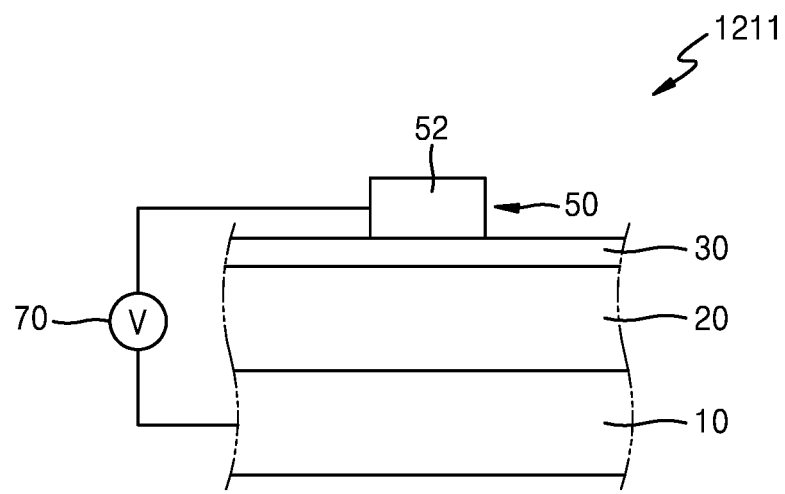
FIG. 3 is a cross-sectional view of an example of a specific structure of an optical phased array, which may be implemented in the LiDAR system of FIG. 1.
Figure 4:
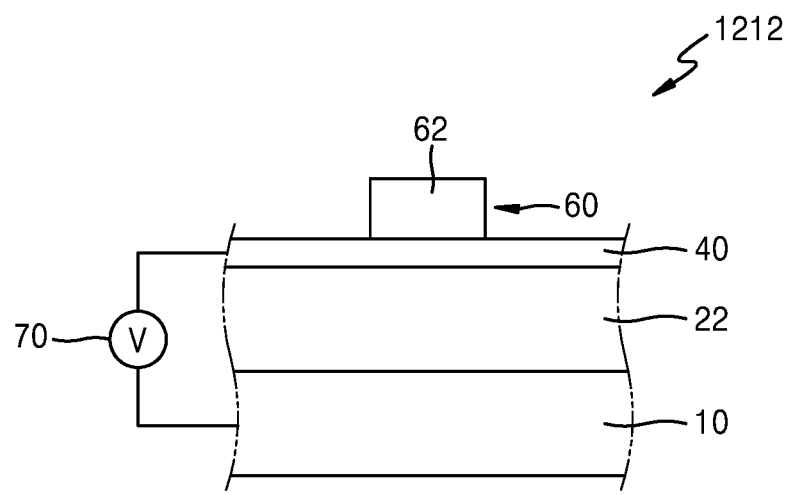
FIG. 4 is a cross-sectional view of another example of a specific structure of the optical phased array, which may be implemented in the LiDAR system of FIG. 1.
Figure 5:
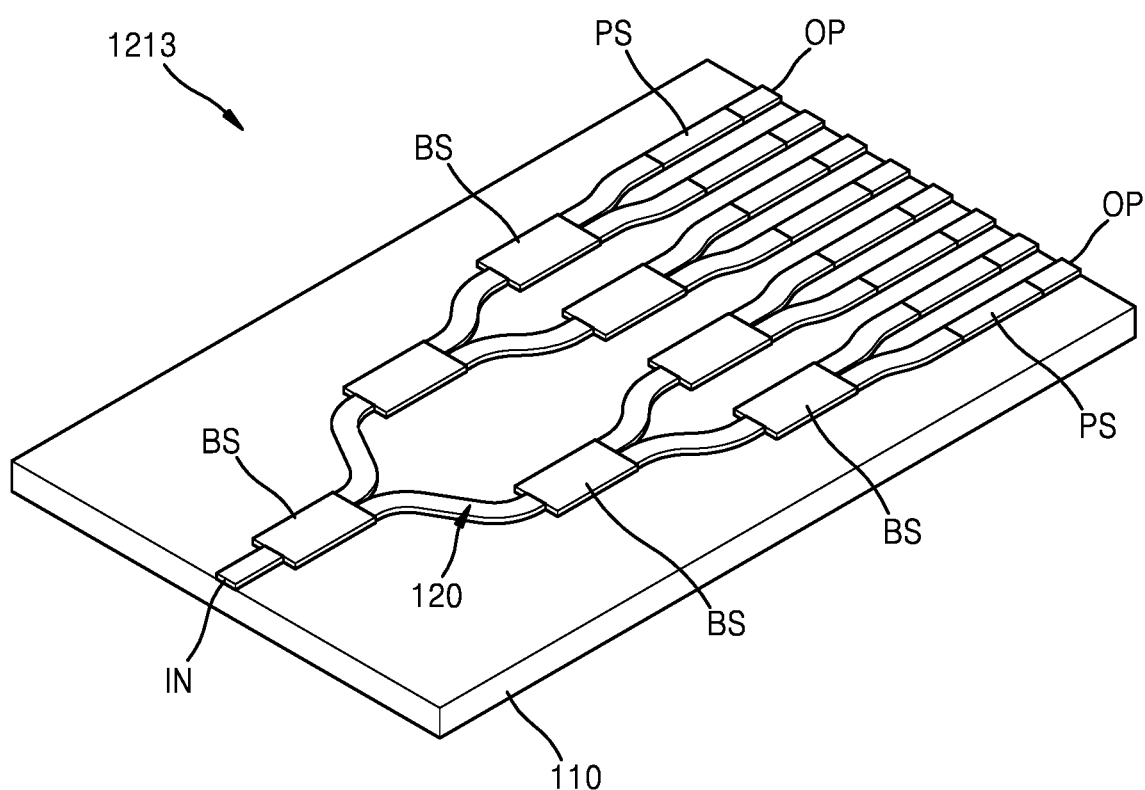
FIG. 5 is a perspective view of another example of a specific structure of the optical phased array, which may be implemented in the LiDAR system of FIG. 1.

FIGS. 3 through 5 are views of examples of specific structures of the optical phased array 1210 implemented in the LiDAR system 1000 of FIG. 1, wherein the optical phased array 1210 is capable of performing non-mechanical steering.

The optical phased array 1210 may include a plurality of meta-devices, wherein each of the plurality of meta-devices includes an active layer having an optical property that changes according to application of an electrical signal, and a sub-wavelength-sized nano-structure adjacent to the active layer. This exemplary structure of the optical phased array 1210 will be described with reference to FIGS. 3 and 4.

FIG. 3 is a cross-sectional view of an example of a specific structure of the optical phased array 1210, which may be implemented in the LiDAR system 1000 of FIG. 1, and FIG. 4 is a cross-sectional view of another example of a specific structure of the optical phased array 1210, which may be implemented in the LiDAR system 1000 of FIG. 1.

Referring to FIG. 3, an optical phased array 1211 may include an active layer 20, a nano-array layer 50 in which a conductive nano-structure 52 is disposed, an electrode layer 10 configured to apply a signal to the active layer 20, and a power unit 70 configured to apply a voltage between the electrode layer 10 and the conductive nano-structure 52. The active layer 20 may include a material having an optical property that changes based on a signal applied thereto. The active layer 20 may include, for example, a material having a dielectric constant that changes based on application of an electric field. The nano-array layer 50 may include a plurality of nano-structures 52. FIG. 3 illustrates one nano-structure 52 corresponding to one channel, as an example. However, the number of channels may be determined according to necessity for forming a desired phase profile. An insulating layer 30 may be arranged between the nano-array layer 50 and the active layer 20.

The nano-structure 52 may have sub-wavelength dimensions. Here, "sub-wavelength" denotes a dimension which is less than a wavelength of an incident light $L_i$ to be modulated by the optical phased array 1211. Any one dimension of the shape of the nano-structure 52, that is, at least one of a thickness, a width, and a length, may be a sub-wavelength dimension.

Conductive materials included in the nano-structure 52 may include a metal material having a high conductivity, such that surface plasmon excitation may occur. For example, the nano-structure 52 may include at least one material selected from Cu, Al, Ni, Fe, Co, Zn, Ti, Ru, Rh, Pd, Pt, Ag, Os, Ir, Pt, and Au. Also, the nano-structure 52 may include an alloy including any one of Cu, Al, Ni, Fe, Co, Zn, Ti, Ru, Rh, Pd, Pt, Ag, Os, Ir, Pt, and Au. Also, the nano-structure 52 may include a two-dimensional (2D) material having a high conductivity, such as graphene, or a conductive oxide.

The active layer 20 may include a material having an optical property that changes according to application of an external signal. The external signal may be an electric signal. The active layer 20 may include a transparent conductive oxide (TCO), such as indium tin oxide (ITO), indium zinc oxide (IZO), aluminum zinc oxide (AZO), and gallium zinc oxide (GZO). Also, the active layer 20 may include a transition metal nitride, such as TiN, ZrN, HfN, and TaN. In addition, the active layer 20 may include an electro-optic material having an effective dielectric constant that changes when an electric signal is applied thereto. That is, the active layer 20 may include $LiNbO_3$, $LiTaO_3$, potassium tantalate niobate (KTN), or lead zirconate titanate (PZT). Also, the active layer 20 may include any of various polymer materials having electro-optic properties.

The electrode layer 10 may include any of various conductive materials. The electrode layer 10 may include a metal material, for example, at least one material selected from Cu, Al, Ni, Fe, Co, Zn, Ti, Ru, Rh, Pd, Pt, Ag, Os, Ir, Pt, and Au. When the electrode layer 10 includes a metal material, the electrode layer 10 may not only function to apply a voltage, but also function as a reflective layer configured to reflect light. The electrode layer 10 may include a TCO, such as ITO, IZO, AZO, and GZO.

The nano-structure 52 may modulate a phase of light having a specific wavelength based on surface plasmon resonance occurring at a boundary between a metal material and a dielectric material, and an output phase value is related to a detailed shape of the nano-structure 52. Also, the output phase value may be adjusted based on a change in the optical property of the active layer 20, the change being caused by the voltage applied between the nano-structure 52 and the electrode layer 10.

Referring to FIG. 4, an optical phased array 1212 may include an active layer 22, a nano-array layer 60 in which a dielectric nano-structure 62 is disposed, the electrode layer 10 configured to apply a signal to the active layer 22, a conductive layer 40 arranged between the nano-array layer 60 and the active layer 22, and a power unit 70 configured to apply a voltage between the electrode layer 10 and the conductive layer 40.

The active layer 22 may include a material having an optical property that changes based on a signal applied thereto. For example, the active layer 22 may include a material having a dielectric constant that changes based on an electric field applied thereto. The nano-array layer 60 may include a plurality of dielectric nano-structures 62. FIG. 4 illustrates one nano-structure 62 corresponding to one channel, as an example.

The active layer 22 may include an electro-optic material having an effective dielectric constant and a refractive index that change when an electric signal is applied thereto. The electro-optic material may include $LiNbO_3$, $LiTaO_3$, KTN, PZT, or the like. Also, the active layer 22 may include any of various polymer materials having electro-optic properties.

The nano-structure 62 may have sub-wavelength dimensions. The nano-structure 62 may include a dielectric material, and thus, may modulate a phase of a light of a specific wavelength based on Mie resonance due to a displacement current. To this end, the nano-structure 62 may include a dielectric material having a refractive index that is higher than a refractive index of the active layer 22. For example, the nano-structure 62 may include a material having a refractive index that is higher than a highest value of a refractive index in a range within which the refractive index of the active layer 22 varies based on an applied voltage. A phase value output by the nano-structure 62 is related to a detailed shape of the nano-structure 62. Also, the phase value output by the nano-structure 62 may be adjusted based on a change in the optical property of the active layer 22, the change being based on the voltage applied between the conductive layer 40 and the electrode layer 10.

FIGS. 3 and 4 illustrate exemplary structures of the optical phased arrays 1211 and 1212, respectively, in which the optical phased arrays 1211 and 1212 include meta-devices including the sub-wavelength nano-structures 52 and 62. Structures of the optical phased array 1210 which may be implemented in the LiDAR system 1000 of FIG. 1 are not limited to the exemplary structures illustrated in FIGS. 3 and 4. The optical phased array 1210 may include structures modified from the structures of FIGS. 3 and 4.

FIG. 5 is a perspective view of another example of a specific structure of an optical phased array 1210, which may be implemented in the LiDAR system 1000 of FIG. 1.

Referring to FIG. 5, an optical phased array 1213 may include a light waveguide 120 configured to diverge input light into a plurality of paths and output the diverged light via a plurality of output terminals OP, and a phase shifter PS configured to adjust a phase delay in each of the plurality of paths.

The optical phased array 1213 may be manufactured on a silicon substrate 110 by using a silicon photonics technique. Beam splitters BS may be provided at divergence points at which the light waveguide 120 is diverged, so that light incident into an input terminal IN may be emitted via any one or more of the plurality of output terminals OP.

A phase shifter PS may be provided on each of the plurality of paths directing light toward the plurality of output terminals OP. A degree of phase delay of each of the plurality of paths may be adjusted by adjusting a signal applied to the respective phase shifter PS. Based on an input signal, the phase shifter PS may change a refractive index of an area of the light waveguide 120, the area being adjacent to the phase shifter PS, in order to delay a phase of light passing through the area of the light waveguide 120 having the changed refractive index. The phase shifter PS may be a heater provided above the light waveguide 120 and electrically heated to heat an area of the light waveguide 120.

The phase shifter PS is not limited to this particular structure. The phase shifter PS may include any of various structures configured to adjust the phase delay degree by adjusting a degree of change in an optical property of an area of the light waveguide 120, based on an applied signal.

FIG. 5 illustrates a structure of 8 channels, in which the light incident into the input terminal IN is diverged and emitted via 8 output terminals OP, as an example. However, the number of output terminals OP is not limited thereto, and may be determined based on the number of channels necessary for forming a desired profile.

FIGS. 3 through 5 illustrate the exemplary structures of the optical phased arrays 1211, 1212, and 1213 configured to steer a beam in a non-mechanical way based on a phase adjustment of each channel. However, structures in which methods of optimizing the beam profile may be implemented are not limited thereto.

Figure 6:
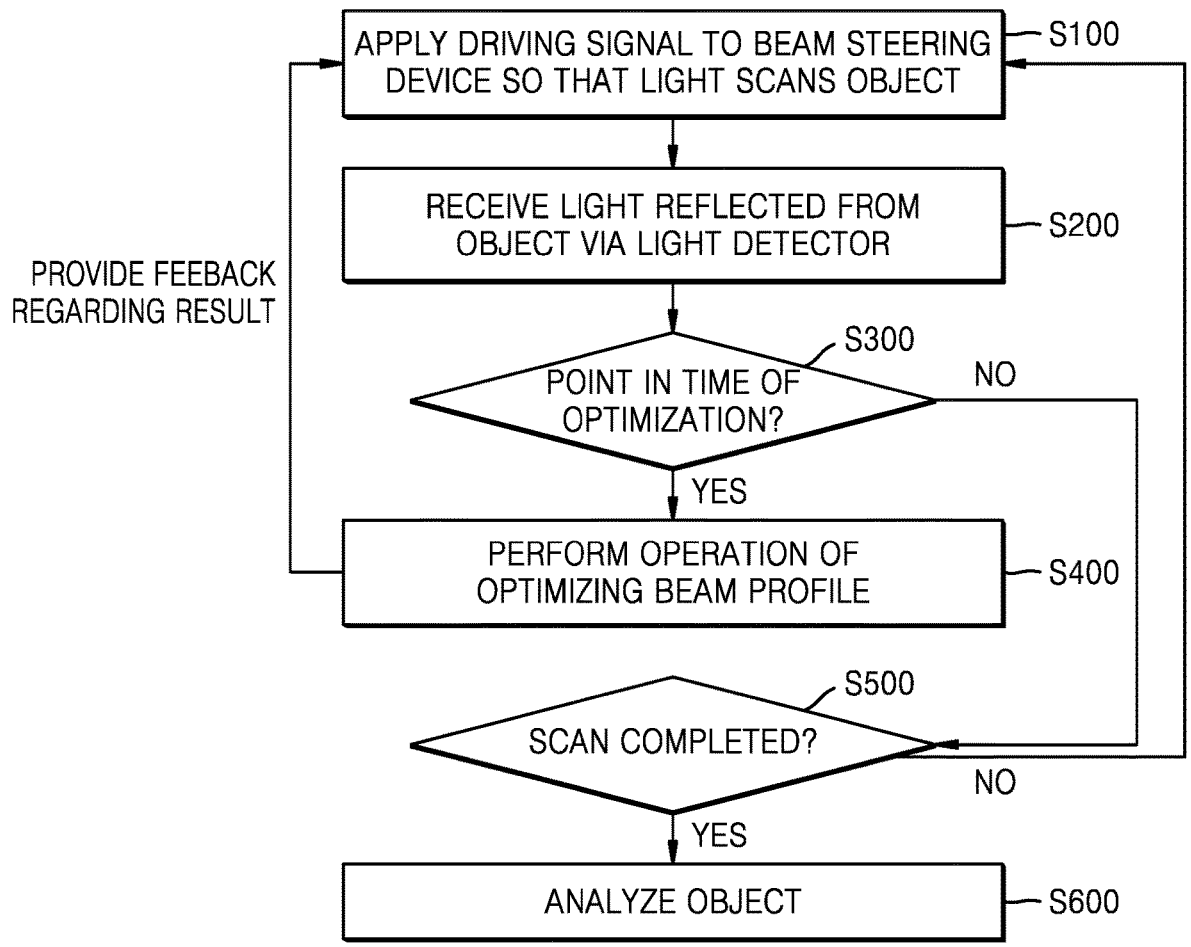
FIG. 6 is a schematic flowchart for describing a method of driving a LiDAR system, according to an exemplary embodiment.

FIG. 6 is a schematic flowchart for describing a method of driving a LiDAR system, according to an exemplary embodiment.

As described above, in order to scan an object is to analyze the object, a beam may be steered in a desired direction by adjusting the phases of a plurality of channels included in a LiDAR system. A beam profile formed in this process, that is, the distribution of intensities based on angles, may include not only a main lobe indicating a peak at an intended angle, but may also include one or more side lobes indicating peaks at other angles. A side lobe may, effectively, be noise and may decrease the SNR, thus deteriorating the efficiency of the whole LiDAR system.

The method of driving the LiDAR system according to the present embodiment may include an operation of optimizing the beam profile in order to provide an optimized beam profile for scanning the object. The optimization of the beam profile may be realized by adjusting a phase realized by each of the channels and forming a desired beam profile, and to this end, a driving signal applied to each of the channels may be adjusted. In order to adjust the driving signal, the beam profile formed by a beam steering device may be measured and analyzed by using a light detector included in the LiDAR system.

First, a method of driving the LiDAR system may include applying the driving signal to the beam steering device so that light may scan an object (S100). The driving signal may be pre-set for each of the channels in order to scan a certain range of angles.

The light irradiated onto the object by the beam steering device may be reflected from the object and received by the light detector (S200).

The optimization operation may be performed by analyzing the beam profile from the light received by the light detector. The optimization operation is not necessarily performed at each when the object is scanned, but may be performed at appropriate points in time.

Based on an operation (S300) of determining a point in time at which the optimization is to be performed, in the case of reaching the corresponding point in time, the operation of optimizing the beam profile may be performed. The optimization operation may be performed at an initial point in time at which the beam steering device initially starts to scan the object. In addition to the initial point in time, the optimization operation may also be performed at one or more points in time, while the beam steering device scans the object. Alternately, the optimization operation may be performed only at one or more points in time while the beam steering device scans the object, and not at the initial point.

Even if, at the initial point in time, a correction value with respect to the driving signal for forming a desired beam profile is calculated and feedback regarding the correction value is given to the beam steering device, errors of the beam profile may increase according to time. This phenomenon may be caused by a change over time in the performance of devices included in each of the plurality of channels of the beam steering device, a change over time in external environments, etc. This phenomenon is also experimentally identified. By taking into account this phenomenon, the optimization operation may be performed a plurality of times while the beam steering device scans the object.

In addition to the initial point in time, the optimization operation may be performed when there is a change in beam intensity at a certain reference location with respect to the object. For example, while the object OBJ is scanned, light may be irradiated onto the same location of the object OBJ, and here, when it is determined that there is a significant change in the beam intensity at the same location, as compared with a beam intensity indicated in a previous beam profile, an additional optimization operation may be performed. Also, when a detection location of the light irradiated onto the same location of the object changes, that is, when the light is detected by a light detecting element at a different location, from among light detecting elements of the light detector, it may be determined that an additional optimization operation is desired.

The above detailed description with respect to the one or more points in time at which the optimization operation is performed is only exemplary, and it is possible to determine the point(s) in time at which the optimization operation is performed, based on other methods. For example, the optimization operation may be performed at points in time generated by equally dividing the total scanning time of the object OBJ by a certain plural number.

The operation (S400) of optimizing the beam profile may be an operation of calculating a correction value with respect to the driving signal, in order to correct an error of the beam steering device. The driving signal applied to the beam steering device may reflect the correction value calculated in this process and may be updated in real time.

The optimization operation may be performed, for example, by calculating a correction value $CV\_i$ (where i is an integer between 1 and M) with respect to each of M channels (where M is an integer greater than 1).

Figure 7:
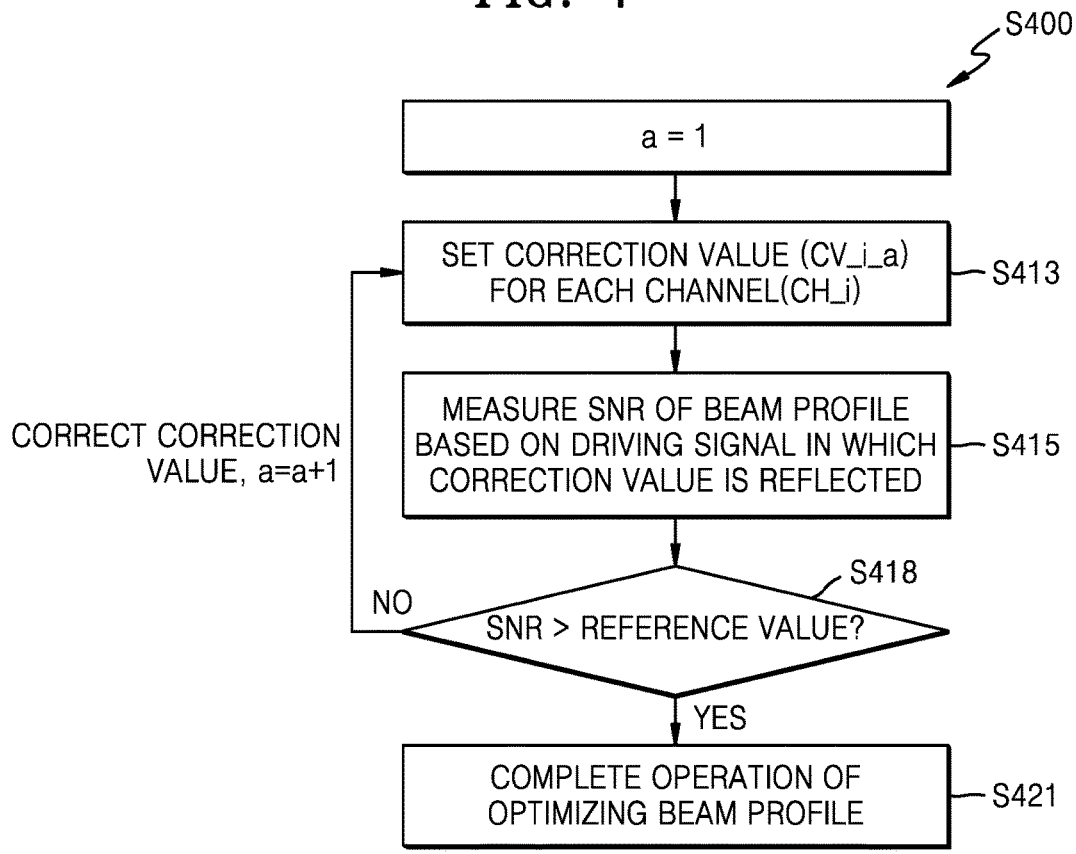
FIG. 7 is a flowchart for describing example operations included in a beam profile optimization operation in the method of driving the LiDAR system of FIG. 6.
Figure 8:
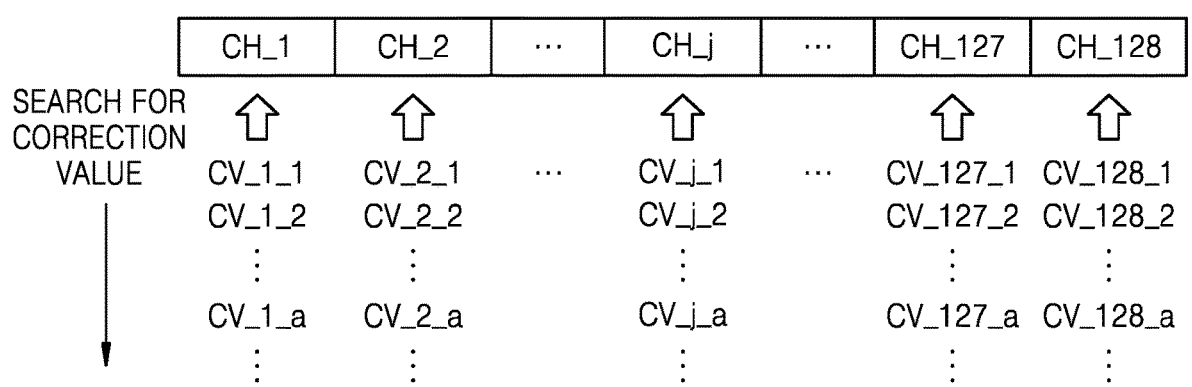
FIG. 8 is a conceptual view for describing a process of changing a correction value assigned to each of the channels and searching for an optimized correction value in the flowchart of FIG. 7.

FIG. 7 is a flowchart of exemplary operations included in the operation (S400) of optimizing the beam profile. FIG. 8 is a conceptual view for describing a process in which a correction value assigned to each of channels is changed and an optimized correction value is searched for in the flowchart of FIG. 7.

In order to search for the correction value, a correction value $CV\_i\_1$ for each channel may be first set. The correction value $CV\_i\_1$ may be a value, in proportion to which, the driving signal initially applied to each channel may be adjusted, or may be a value, by which the driving signal initially applied to each channel may be added or subtracted. The correction value $CV\_i\_1$ is not limited thereto, and may be a reference value for adjusting the driving signal in other methods.

Next, an SNR of a beam profile based on the driving signal in which the correction value $CV\_i\_1$ is reflected may be measured (S415) and it may be determined whether or not the measured SNR exceeds a certain reference value (S418).

When the measured SNR is greater than the certain reference value, the correction value $CV\_i\_1$ may be selected as a value for providing an optimized beam profile and the optimization of the beam profile may be completed (S421). However, when the measured SNR is equal to or less than the certain reference value, a next correction value $CV\_i\_2$ may be set, and the SNR of the beam profile based on the driving signal in which the correction value $CV\_i\_2$ is reflected may be measured (S415) and it may be determined whether or not the measured SNR satisfies the certain reference value (S418).

As shown above, from among correction values $CV\_i\_a$ that are repeatedly set, a value satisfying an SNR condition of the beam profile may be confirmed as the value for providing the optimized beam profile and the optimization of the beam profile may be completed (S421).

FIG. 8 illustrates an example in which a beam steering device includes 128 channels and a different correction value is repeatedly reflected with respect to each of the channels to search for a correction value for obtaining a beam profile satisfying a desired condition. Specific values of the correction values used in the repeated process may vary based on a search algorithm.

The search algorithm for searching for the correction value for obtaining the beam profile satisfying the desired condition may include algorithms based on any of various methods. For example, the search algorithm may include an algorithm for searching for a global maximum and an algorithm for searching for a local maximum.

The algorithm for searching for a global maximum may include a genetic algorithm (GA) using a fast converging method or an affected by time variance method, differential evolution using a stochastic method, a slow converging method, or a robust by time variance method, and particle swarm optimization that is similar to the GA. From among the algorithms for searching for a global maximum, the GA is known to have the highest speed, and thus, may be preferred as the search algorithm. However, the search algorithm is not limited thereto.

The algorithm for searching for local maximum may include a gradient-search using a very fast converging method or an only finding local solution method, hill climber using a fast converging method or the only finding local solution method, and rapid searching that is similar to the hill climber.

In addition, the search algorithm may include a pattern-search algorithm, a simulated annealing algorithm, a simplex algorithm, etc.

When the optimization of the beam profile is performed, one or more of the above described algorithms may be appropriately selected based on desired conditions related to speed or accuracy. For example, in the case of the optimization at an initial point in time, the algorithm for searching for a global maximum may be used, and in the case of an optimization in real time, the algorithm for searching for local maximum may be used in order to take the speed aspect into account.

Figure 9:
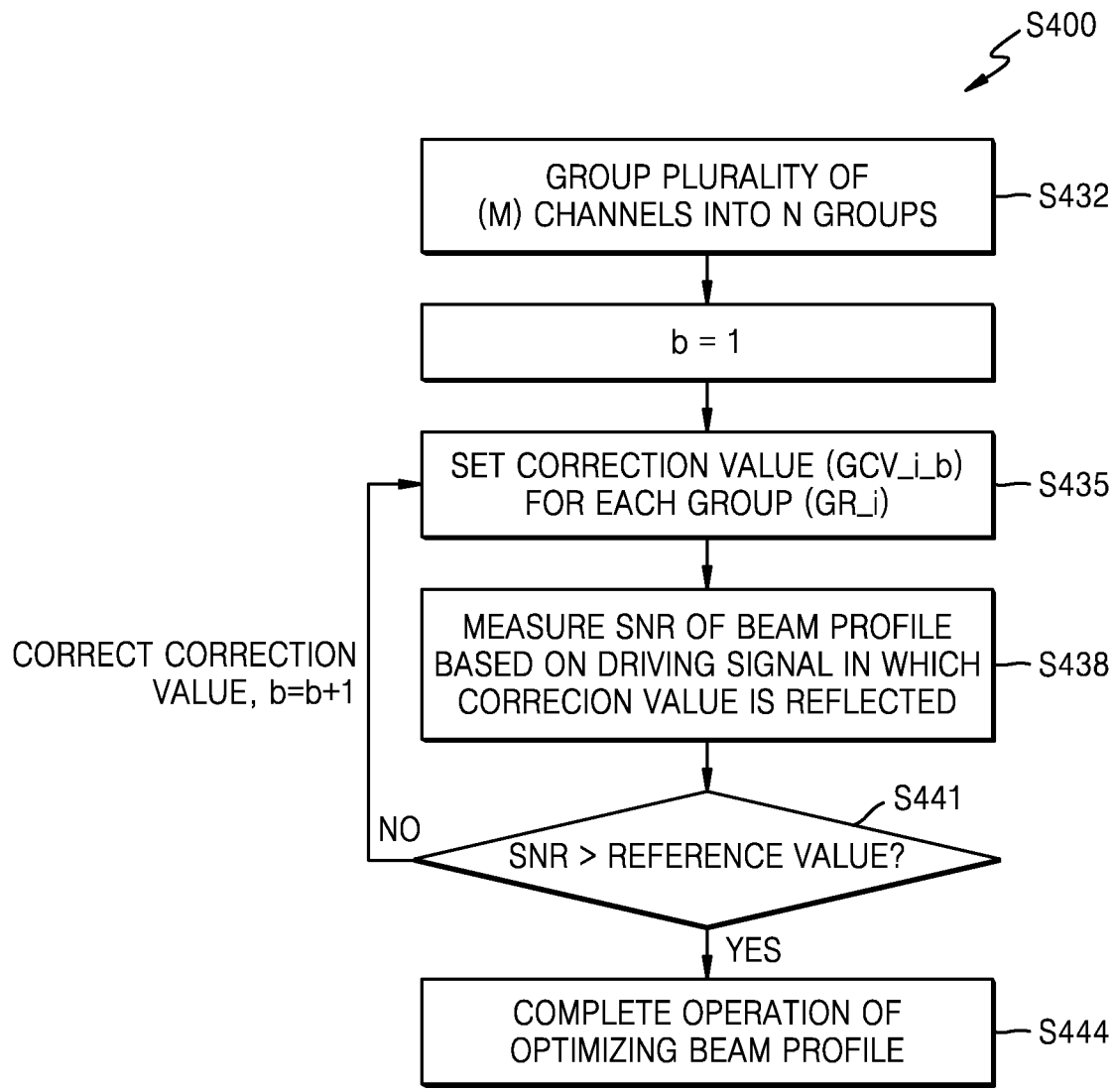
FIG. 9 is a flowchart for describing other exemplary operations included in the beam profile optimization operation in the method of driving the LiDAR system of FIG. 6.

FIG. 9 is a flowchart for describing other exemplary operations included in the beam profile optimization operation in the method of driving the LiDAR system of FIG. 6. FIGS. 10A and 10B illustrate examples in which a plurality of channels (M channels) are grouped into a plurality of groups (N groups) in the flowchart of FIG. 9, and FIG. 11 is a conceptual view for describing a process of changing a correction value assigned to each of the groups and searching for an optimized correction value in the flowchart of FIG. 9.

As illustrated in FIGS. 7 and 8, when the correction value is separately applied to all of the channels included in the beam steering device, the number of variables used in the optimization operation may correspond to the number of channels. Unlike this, the number of variables for the optimization operation may be reduced by grouping the plurality of channels.

The plurality of channels (M channels) may be grouped into a plurality of groups (N groups) (S432). Methods of grouping the channels may include setting a plurality of groups by grouping the plurality of channels into a certain number of groups based on an order in which the plurality of channels are adjacent to each other. For example, when each channel CH_i (where i is an integer between 1 and M) is set based on the order in which the plurality of channels are arranged, and when the number of the channels is M and the number of the groups is N, in a $j^{th}$ group (GR_j), the channels represented as CH_k (where k is an integer between (M/N)(j−1)+1 and (M/N)j) may be included. FIG. 10A shows this grouping method and illustrates the example in which the number of the channels is 128 and the number of the groups is 16.

Alternatively, as illustrated in FIG. 10B, the plurality of groups may be set by grouping the plurality of channels into a certain number of groups based on a certain distance between the plurality of channels. When the number of the channels is M and the number of the groups is N, in the $j^{th}$ group (GR_j), the channels represented as CH_p (p is equal to (M/N)(q−1)+j, q is an integer between 1 and (M/N)) may be included. FIG. 10B illustrates the example in which the number of the channels is 128 and the number of the groups is 16.

Referring to FIG. 9 again, after the grouping is completed, first a correction value GCV_i_1 for each group may be set in order to search for a correction value (S435). That is, a same correction value GCV_i_1 may be applied to the channels included in the same group GR_i. This correction value may be a value, in proportion to which a driving signal initially applied to each channel, for each group, is to be adjusted, or may be a value, by which the driving signal is to be added or subtracted. The correction value GCV_i_1 is not limited thereto, and may include a reference value for adjusting the driving signal in other methods.

Next, an SNR of a beam profile based on the driving signal in which the correction value GCV_i_1 is reflected may be measured (S438) and it may be determined whether or not the measured SNR exceeds a certain reference value (S441).

When the measured SNR is greater than the certain reference value, the correction value GCV_i_1 may be selected as a value for providing an optimized beam profile, and the optimization of the beam profile may be completed (S444). However, when the measured SNR is equal to or less than the certain reference value, a next correction value GCV_i_2 may be set (S435), and the SNR of the beam profile based on the driving signal in which the correction value GCV_i_2 is reflected may be measured (S438) and it may be determined whether or not the measured SNR satisfies the certain reference value (S441).

As shown above, from among correction values GCV_i_b that are repeatedly set, a value satisfying an SNR condition of the beam profile may be confirmed as the value for providing the optimized beam profile and the optimization of the beam profile may be completed (S444).

When the optimization operation is performed by using the grouping method, the speed of the optimization operation may be increased. However, a desired SNR condition may not be satisfied due to errors among the groups. Thus, an additional optimization operation to reduce these errors may be performed. For example, by performing operations up until operation S444 as an overall first step, the correction value for each group may be optimized in order to satisfy a certain condition of an SNR reference value, and as an additional step, the optimization operation may be performed to minimize the errors among the groups, so as to satisfy a higher condition of the SNR reference value.

FIG. 11 illustrates an example in which a beam steering device includes 128 channels, and a different correction value with respect to each of groups is repeatedly reflected to search for a correction value. A specific value of the correction value assigned to each group may vary based on a specific grouping method, and specific values of the correction values used in the repeated process may vary based on a search algorithm. The search algorithm may include any of various algorithms described as examples with reference to FIGS. 7 and 8.

As described above, when the optimization operation is performed by grouping the plurality of channels into a certain number of groups, the number of variables used in the optimization operation may be reduced, and thus, the speed of the optimization operation may be increased. The number of the groups or the grouping method may be appropriately selected by taking into account the efficiency of the optimization operation, for example, the speed or the accuracy of the optimization operation.

As described above, according to the one or more of the above exemplary embodiments, according to s LiDAR system and s method of driving the LiDAR system, the beam profile formed by the beam steering device may be analyzed by using the light detector provided in the LiDAR system and the correction value may be calculated, and thus, the beam profile may be optimized.

The optimization of the beam profile may be performed at an initial point in time at which the LiDAR system starts to be driven and/or may be selectively performed while the LiDAR system scans the object. Also, feedback related to a result of the optimization of the beam profile may be provided in real time. Accordingly, the accuracy of analyzing the object may be increased.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) system comprising:
   a light source;
   a beam steering device configured to steer light emitted from the light source toward an object, wherein the beam steering device comprises:
      an optical phased array comprising a plurality of channels, and
      a signal input unit configured to apply a plurality of driving signals to the plurality of channels, respectively;
   a light detector configured to detect light steered by the beam steering device and reflected from the object; and
   a processor configured to perform an optimization operation comprising:
      analyzing the light detected by the light detector,
      calculating at least one correction value,
      controlling the plurality of driving signals of the signal input unit according to the at least one correction value, thereby correcting an error of the beam steering device, and
      determining the at least one correction value such that a signal to noise ratio (SNR) of a beam profile output according to the at least one correction value exceeds a certain reference value.

2. The LiDAR system of claim 1, wherein each of the plurality of driving signals is an electrical signal configured to adjust a phase of light emitted from a respective one of the plurality of channels.

3. The LiDAR system of claim 1, wherein the at least one correction value comprises a correction value corresponding to each of the plurality of channels.

4. The LiDAR system of claim 1, wherein the plurality of channels comprise a plurality of groups, each comprising at least one of the plurality of channels, and the at least one correction value comprises a correction value corresponding to each of plurality of groups.

5. The LiDAR system of claim 4, wherein the processor is further configured to set the plurality of groups by grouping the plurality of channels into a certain number of groups based on an order in which the plurality of channels are adjacent to each other.

6. The LiDAR system of claim 4, wherein the processor is further configured to set the plurality of groups by grouping the plurality of channels into a certain number of groups based on a certain distance between the plurality of channels.

7. The LiDAR system of claim 4, wherein the processor is further configured to perform an additional optimization operation comprising:
   analyzing light detected by the light detector based on the at least one correction value,
   calculating at least one updated correction value taking an error among the plurality of groups into account, and
   controlling the plurality of driving signals of the signal input unit according to the at least one updated correction value.

8. The LiDAR system of claim 1, wherein the processor is further configured to perform the optimization operation at an initial point in time at which the beam steering device starts to scan the object.

9. The LiDAR system of claim 1, wherein the processor is further configured to perform the optimization operation at least two times, while the beam steering device scans the object.

10. The LiDAR system of claim 8, wherein the processor is further configured to perform the optimization operation when there is a change in beam intensity at a certain reference location with respect to the object.

11. The LiDAR system of claim 1, wherein the optical phased array comprises a plurality of meta-devices, wherein the plurality of meta-devices comprise an active layer having an optical property that is variable based on an electrical signal applied thereto, and a nano-structure adjacent to the active layer, wherein all dimensions of the nano-structure are smaller than a wavelength of the light emitted from the light source.

12. The LiDAR system of claim 1, wherein the optical phased array comprises a waveguide comprising an input into which the light emitted from the light source is incident and a plurality of output terminals, and a phase shifter configured to adjust a phase delay of light output from each of the plurality of output terminals.

13. A method of driving a light detection and ranging (LiDAR) system, the method comprising:
   applying a driving signal to a beam steering device;
   driving the beam steering device according to the driving signal and thereby scanning light from a light source over an object;
   detecting light reflected from the object via a light detector; and
   performing an optimization operation comprising:
      analyzing the light detected by the light detector,
      calculating a correction value with respect to the driving signal, in order to correct an error of the beam steering device,
   wherein the calculating the correction value comprises using a search algorithm to find the correction value which, when applied to the driving signal results in a beam profile, output from the beam steering device, which has a signal to noise ratio which exceeds a certain reference value.

14. The method of claim 13, wherein the performing the optimization operation comprises performing the optimization operation at an initial point in time when the beam steering device starts to scan the object.

15. The method claim 13, further comprising performing the optimization operation at least two times, while the beam steering device scans the object.

16. The method of claim 13, further comprising applying the correction value to the driving signal in real time.

17. The method of claim 13,
   wherein the beam steering device comprises an optical phased array, comprising a plurality of channels, and a signal input unit, and the applying the driving signal to the beam steering device comprises the signal input unit applying the driving signal to each of the plurality of channels, and the plurality of channels comprise a plurality of groups, each comprising at least one of the plurality of channels organized based on an order in which the plurality of channels are adjacent to each other, and the calculating the correction value further comprises calculating a correction value for each group.

18. The method of claim 13,
wherein the beam steering device comprises an optical phased array, comprising a plurality of channels, and a signal input unit, and the applying the driving signal to the beam steering device comprises the signal input unit applying the driving signal to each of the plurality of channels, and
the plurality of channels comprise a plurality of groups, each comprising at least one of the plurality of channels organized based on a certain distance between the plurality of channels, and the calculating the correction value further comprises calculating a correction value for each group.

19. A method of driving a light detection and ranging (LiDAR) system, the method comprising:
applying plurality of driving signals, respectively, to each of a plurality of channels of a beam steering device;
scanning light over an object using the plurality of channels of the beam steering device driven by the plurality of driving signals;
detecting light reflected from the object;
calculating at least one correction value based on the detected light;
applying the at least one correction value to the plurality of driving signals,
wherein the beam steering device comprises an optical phased array, comprising the plurality of channels, and a signal input unit,
wherein the applying the plurality of driving signals to the beam steering device comprises applying, by the signal input unit, the plurality of driving signals to each of the plurality of channels,
wherein the plurality of channels comprise a plurality of groups, each comprising at least one of the plurality of channels organized based on an order in which the plurality of channels are adjacent to each other, and
wherein the calculating the at least one correction value further comprises calculating a correction value for each group.

* * * * *